United States Patent
Reist

[19]

[11] Patent Number: 6,073,392
[45] Date of Patent: Jun. 13, 2000

[54] AQUATIC PLANT FERTILIZING SYSTEM

[76] Inventor: David Frederick Reist, 104 Owl Hill Rd., Lititz, Pa. 17543

[21] Appl. No.: 09/021,824
[22] Filed: Feb. 11, 1998
[51] Int. Cl.[7] .................................................. A01G 29/00
[52] U.S. Cl. .............................................................. 47/48.5
[58] Field of Search ..................... 47/59, 62, 69, 47/48.5; 119/264, 269

[56] References Cited

U.S. PATENT DOCUMENTS

| | | |
|---|---|---|
| 728,088 | 5/1903 | Dillon . |
| 1,169,449 | 1/1916 | Williamson ............................. 119/264 |
| 1,383,368 | 7/1921 | Ambrose . |
| 1,915,884 | 6/1933 | Gericke . |
| 4,148,155 | 4/1979 | Allen . |
| 4,207,705 | 6/1980 | Errede et al. . |
| 4,310,990 | 1/1982 | Payne . |
| 4,453,343 | 6/1984 | Grimes, Sr. . |
| 4,829,708 | 5/1989 | Gonzalez . |
| 5,097,626 | 3/1992 | Mordoch . |
| 5,212,904 | 5/1993 | Green et al. ............................. 47/48.5 |
| 5,259,142 | 11/1993 | Sax . |
| 5,568,701 | 10/1996 | Haigler . |

*Primary Examiner*—Peter M. Poon
*Assistant Examiner*—Francis T. Palo
*Attorney, Agent, or Firm*—Jacobson, Price, Holman & Stern, PLLC

[57] ABSTRACT

The feeding system works on the principle of allowing a liquid to be introduced at the base of a container, or the root system of the plant. A feeding device is used which consists of two parts constructed out of a heavy gauge black polypropylene plastic. The feeding device is placed into a closed (without drainage holes) planting container. The feeding device is of an "L" shape design. The upper part of the feeding device or feed receiver is the part of the feeding device that allows the user to unscrew a cap and pour fertilizer into a main part of the feeding device.

17 Claims, 3 Drawing Sheets

AQUATIC PLANT FERTILIZING SYSTEM

FIELD OF THE INVENTION

The present invention relates to a system for fertilizing aquatic plants, such as water lilies and marginal bog plants which thrive on nutrient rich soil.

BACKGROUND OF THE INVENTION

The conventional way of fertilizing water plants is to use a timed released plug that is inserted into the soil once every two to three weeks. The plug releases chemical fertilizer into the soil which is absorbed by the plant's root system.

Another product that allows a water plant to absorb much needed nutrients is a design that works as a filtration device and a fertilizer. Waste is pulled through a bag containing material to trap fish waste, bacteria, and suspended particles. The water lily, a tuberous root plant, is placed in the middle of this bag and is supposed to absorb the nutrients as they are collected.

However, one of the concerns expressed by individuals involved with water gardening, is that many people wish to garden organically. There is currently no product or system that allows an organic gardener to fertilize their aquatic plants.

SUMMARY OF THE INVENTION

Accordingly, it is an object of the present invention to provide individuals involved with water gardening the possibility of using organic fertilizer in a direct plant feeding system.

The feeding system of the present invention allows aquatic plants to more efficiently absorb nutrients provided by fertilizer. The use of a liquid type fertilizer eliminates the need for a chemical solid to break down before it is absorbed by the plant. The present invention also allows individuals more choices in the type of fertilizing media to be used. Further, fertilizing tabs or organic compounds can be used.

The feeding system of the present invention works on the principle of allowing a liquid or solid to be introduced at the base of a container, or the root system of the plant. A feeding device is used which consists of two parts. The feeding device is placed into a closed (without drainage holes) planting container.

The feeding device is of an "L" shape design. The upper part of the feeding device or feed receiver is the part of the feeding device that allows the user to unscrew a cap and pour fertilizer into a main part of the feeding device. The feed receiver is injection molded of black polypropylene plastic.

The main part of the feed receiver includes a cap having internal threads. The cap measures approximately 1.5 inches in length and is inserted over a 1 ⅞" outer diameter tube.

The cap includes a removable rubber washer that will insure a compression tight fit when the cap is properly tightened against the tube. An upper portion of the feed tube includes external threads measuring 1 5/16" inside diameter by 1 7/16" outer diameter with a wall thickness of ⅛". Alternatively, a compression fit may be used.

The total length of the feed receiver is 5" until transitioning by an inward taper to a reduced diameter of 10/16" outer diameter feed tube portion. The reduced diameter portion of the feed tube has a 10/16" outer diameter by ½" inside diameter by ⅛" thick.

The reduced diameter feed tube portion extends downward from the main portion for 4" and includes a 90° elbow section at its lowest end. From the 90° elbow the remainder of the feed receiver extends for approximately two inches. The feed receiver terminates in an externally threaded portion.

This externally threaded portion allows connection with a feed dispensing tube or by a compression fit. The feed dispensing tube is approximately six inches in length and includes a ½" inside diameter by 10/16" outer diameter and a wall thickness of ⅛". Alternatively, the feed dispensing tube is approximately twelve inches in length. The feed dispensing tube is made of schedule 40 grade, PVC pipe.

A 10/16" outer diameter rubber washer is fitted over the terminal threaded portion of the feed receiver. The rubber washer provides a tight compression fit with the feed dispensing tube when the feed dispensing tube and the feed receiver are assembled.

The opposite end of the feed dispensing tube is closed to prevent any of the liquid fertilizer from passing therethrough. The feed dispensing tube includes five ⅛" diameter holes evenly spaced along a bottom section of the feed dispensing tube. These holes allow the liquid fertilizer to pass out of the bottom of the feed dispensing tube into the surrounding soil.

For optimum growth and blooming of the water plants it is only necessary that the submerged container in which the feeding system of the present invention is located is removed from below the water and refilled with fertilizer every two months. This time frame will allow the water gardener more opportunity to enjoy their garden rather than worrying about fertilizing every two to three weeks.

The aquatic plant fertilizing system of the present invention, provides liquid nutrients to the base of a water plant and provides the consumer with a product that will allow them to choose between organic and conventional chemical fertilizers. The present invention will also let the consumer spend more time enjoying their garden and the tremendous growth of their aquatic plants. Some of the aquatic plants which can take advantage of the benefits of the present invention include water lilies, marginal plants and lotus plants.

It is therefore another object of the present invention to provide an aquatic plant fertilizing system having a connected feed receiver and feed dispensing tube for directly providing fertilizer to the root system of an aquatic plant.

It is another object of the present invention to provide an aquatic plant fertilizing system which dispensing fertilizer in a container provided with soil and the root system of an aquatic plant, with the container being submerged in a body of water.

It is still yet another object of the present invention to provide an aquatic plant fertilizing system located in a container submerged in a body of water with the container being retrievable for refilling of the plant fertilizing system every two months so as to provide additional fertilizer to the root system of an aquatic plant rooted in a container removable from the body of water.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
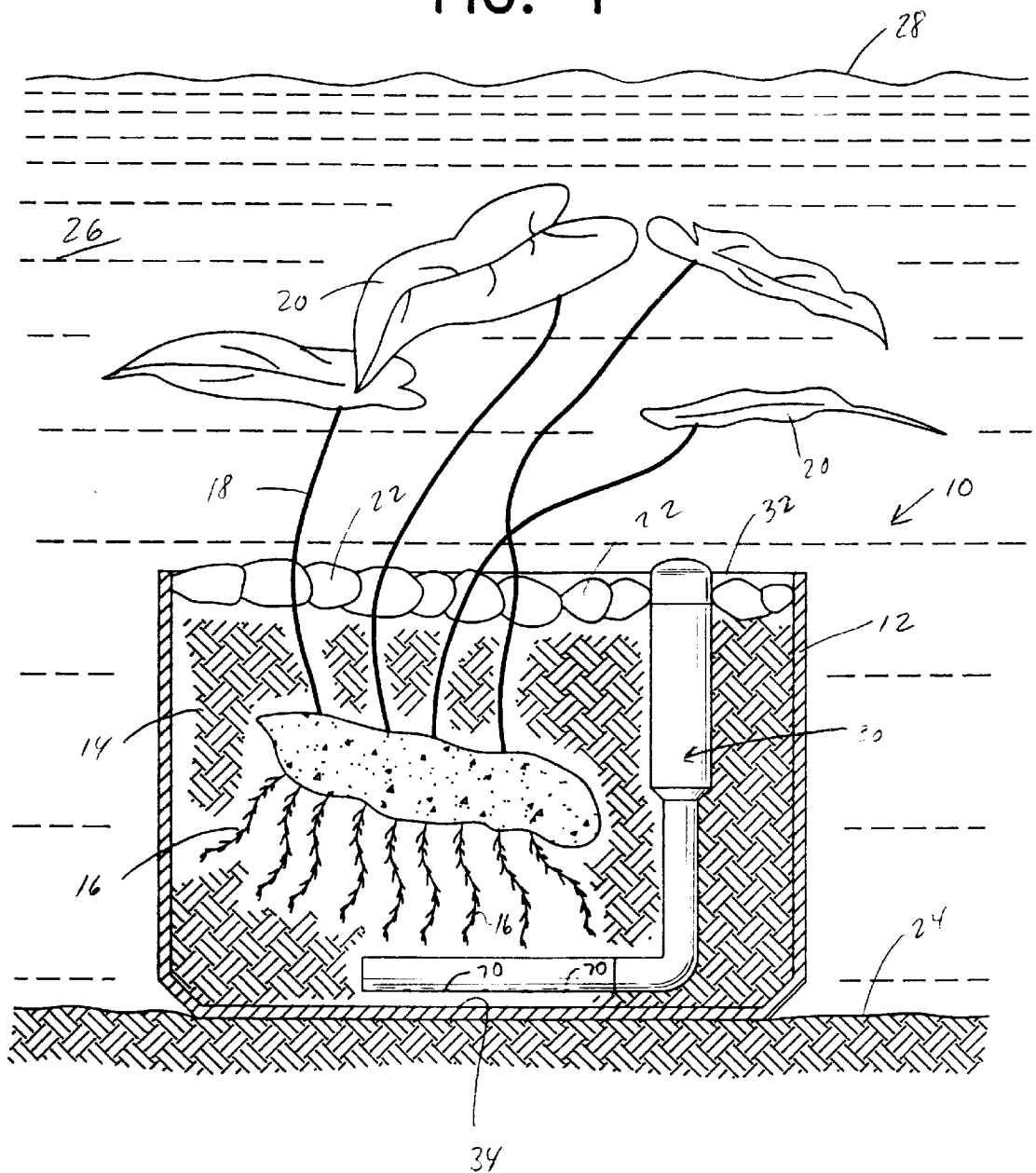
FIG. 1 is a cross-sectional view of the aquatic plant fertilizing system of the present invention contained in a container located at the bottom of a body of water with the container including soil and a root system for an aquatic plant.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, an aquatic plant fertilizing system embodying the teachings of the subject invention is generally designated as 10. The system includes a container 12 holding soil 14 within which is contained a root system 16 of an aquatic plant, including stems 18 leading to leaf structures 20. On top of the soil 14 are a plurality of stones 22, typically of one inch diameter, so as to retain the soil 14 in the container 12. The container 12 rests on the floor 24 of a body of water at a distance of approximately 18 to 24 inches from the surface of the water. The leaves 20 of the aquatic plant generally float at or below the upper level 28 of the body of water 26.

Housed within the container 12 is a feeding device 30. The feeding device 30 projects at one end slightly above the upper surface 32 of the container. The other end of the feeding device extends along the bottom 34 of the container, below the roots 16 of the aquatic plant.

Figure 2:
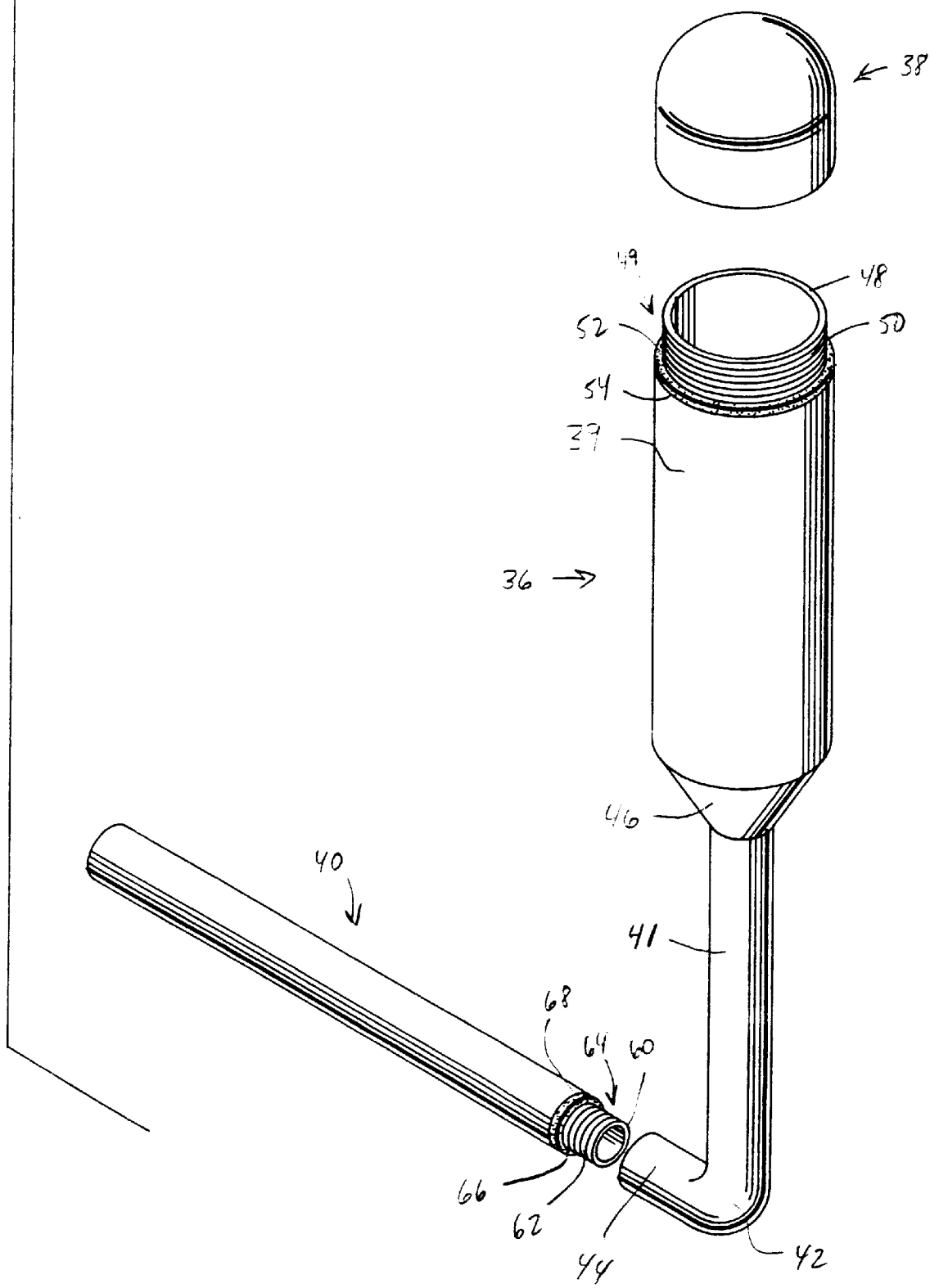
FIG. 2 is an exploded view of a feeding device forming part of the aquatic plant fertilizing system of the present invention.

As shown in FIG. 2, the feeding device includes a feed receiver 36, a cap 38 and a feed tube 40. The feed receiver includes an enlarged main body portion 39 which communicates with a reduced diameter portion 41, terminating in an elbow 42 and connecting a perpendicular extending portion 44 with the reduced diameter portion 41. A conically shaped portion 46 interconnects the main body portion 39 with the reduced diameter portion 41.

The upper end 48 of portion 39 includes external threads 50 at reduced diameter portion 49. An O-ring gasket 52 is located on a shoulder 54 at the bottom of the threaded portion 50.

The cap 38 includes internal threads 56. The threads 56 threadingly engage the external threads 50 of the main portion 39 to form a water tight seal with gasket 52.

At the opposite end of the feed receiver 36, located at the perpendicular extending portion 44, are internal threads 58. The feed dispensing tube 40 includes at end 60, external threads 62 located on a reduced diameter portion 64. Reduced diameter portion 64 includes an O-ring gasket 66 located on a shoulder 68. The external threads 62 threadingly engage the internal threads 58 of perpendicular extending portion 44 to form a water tight seal with gasket 66.

Figure 3:
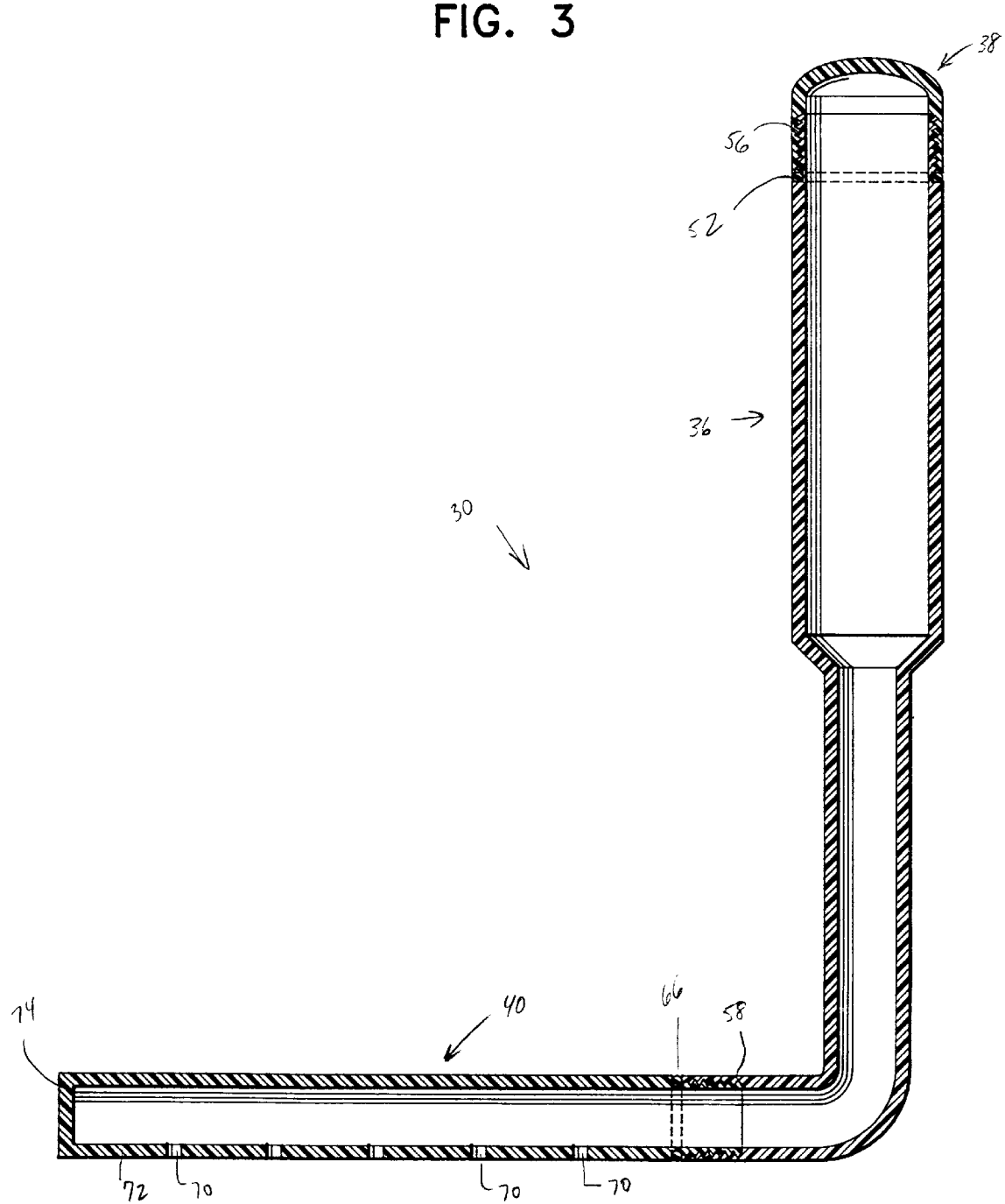
FIG. 3 is a cross-sectional view of the feeding device to illustrate the interconnected parts of the feeding device and the dispensing holes located at a lower portion of a feed dispensing tube.

When assembled, the cap 38 will be located on the feed receiver 36 and the feed dispensing tube 40 will be secured to the perpendicular extending portion 44 of the feed receiver 36, as shown in FIG. 3. In this assembled condition, a water tight seal is formed between the cap 38 and the main body portion 39. Similarly, a water tight seal is formed between the perpendicular extending portion 44 and the feed dispensing tube 40. The cap 38 is unscrewed for filling of the feeding device 30 in place in the container 12 with surrounding soil 14.

The feed dispensing tube 40 includes five ⅛" diameter holes 70 located in a lower surface 72. The end 74 of the feed dispensing tube located opposite to reduced diameter portion 64, is sealed. Accordingly, when fertilizer is fed into the feeding device, the only locations through which fertilizer may be released are through holes 70. Since the feeding device 30 is located in a container filled with soil, the fertilizer is only released into the soil located immediately below the roots 16 of an aquatic plant as shown in FIG. 1.

After approximately two months, the fertilizer in the feeding device 30 will be released into the soil 14. The container 12 is then manually lifted from the body of water 26. The cap 38 is unscrewed with the feeding device 30 remaining in place in the container 12. Additional fertilizer is poured into the feeding device 30. The cap 38 is then resealed. The container, including the feeding device 30 is then repositioned at the bottom 24 of body of water 26 for approximately two months, after which, the cycle is repeated.

By the present invention, preferably liquid fertilizer is directly provided to the root system of an aquatic plant planted in soil in a removable container. The direct feeding of nutrients to the root system of an aquatic plant enhances the health and amount of growth realized by the aquatic plant in a time released system that only needs to be attended to once approximately every two months.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. An aquatic plant fertilizing system comprising, in combination:
    a body of water having a floor,
    a planting container submerged in said body of water and resting on said floor,
    soil located in said planting container,
    a root system of an aquatic plant located in said soil, said aquatic plant having leaves located in said body of water, and
    a fertilizer feeding device located in said container and extending into said soil, below said root system,
    said fertilizer feeding device including a feed receiver, a cap removably mounted on one end of said feed receiver, and a feed dispensing tube located at an opposite end of said feed receiver for receipt of fertilizer from said feed receiver, said feed dispensing tube including a plurality of holes spaced along a lowermost surface for the only release of fertilizer to the soil and to the root system of the aquatic plant housed in the container, said feed dispensing tube being closed ended and sealed except for said plurality of holes.

2. An aquatic plant fertilizing system as claimed in claim 1, wherein rocks are located on top of said soil to retain said soil in said container.

3. An aquatic plant fertilizing system as claimed in claim 2, wherein said fertilizer feeding device extends through said rocks.

4. An aquatic plant fertilizing system as claimed in claim 2, wherein said fertilizer feeding device extends through said rocks and along a bottom of said container.

5. An aquatic plant fertilizing system as claimed in claim 4, wherein at least part of said fertilizer feeding device extends below said root system.

6. An aquatic plant fertilizing system as claimed in claim 1, wherein said container is removably mounted in said body of water.

7. An aquatic plant fertilizing system as claimed in claim 1, wherein said fertilizer feeding device is L-shaped.

8. An aquatic plant fertilizing system as claimed in claim 7, wherein said fertilizer feeding device includes a plurality of holes for releasing fertilizer to said root system of said aquatic plant located in said container.

9. An aquatic plant fertilizing system as claimed in claim 1, wherein said feeding device includes a feed receiver, a feed dispensing tube and a removable cap for said feed receiver.

10. An aquatic plant fertilizer feeding device for dispensing fertilizer to a root system of an aquatic plant located in a container including soil, located at a bottom of a body of water, said aquatic plant fertilizer feeding device comprising:

a feed receiver, a cap removably mounted on one end of said feed receiver, and a feed dispensing tube located at an opposite end of said feed receiver for receipt of fertilizer from said feed receiver, said feed dispensing tube including a plurality of holes spaced along a lowermost surface for the only release of fertilizer to the soil and to the root system of the aquatic plant housed in the container, said feed dispensing tube being closed ended and sealed except for said plurality of holes.

11. An aquatic plant fertilizing feeding device as claimed in claim 10, wherein said feed dispensing tube extends substantially perpendicular to at least a portion of said feed receiver.

12. An aquatic plant fertilizing feeding device as claimed in claim 10, wherein said feed receiver includes a main body portion communicating with a reduced diameter portion by a conically shaped portion.

13. An aquatic plant fertilizing feeding device as claimed in claim 12, wherein said reduced diameter portion includes an elbow, changing a direction of conveyance of fertilizer through said feed receiver by 90°.

14. An aquatic plant fertilizing feeding device as claimed in claim 10, wherein a sealing ring is located between said cap and said feed receiver.

15. An aquatic plant fertilizing feeding device as claimed in claim 14, wherein another sealing ring is located between said feed receiver and said feed dispensing tube.

16. An aquatic plant fertilizing feeding device as claimed in claim 11, wherein said plurality of holes have a diameter of 1/8 inch.

17. An aquatic plant fertilizing feeding device as claimed in claim 10, wherein said cap and said feed dispensing tube are threadingly engaged with said feed receiver.

* * * * *